(12) United States Patent
Newton et al.

(10) Patent No.: US 7,932,899 B2
(45) Date of Patent: Apr. 26, 2011

(54) DETERMINING THE LOCATION OF TOUCH POINTS IN A POSITION DETECTION SYSTEM

(75) Inventors: John David Newton, Auckland (NZ); Keith John Colson, Auckland (NZ)

(73) Assignee: Next Holdings Limited (NZ)

( * ) Notice: Subject to any disclaimer, the term of this patent is extended or adjusted under 35 U.S.C. 154(b) by 0 days.

(21) Appl. No.: 12/873,466

(22) Filed: Sep. 1, 2010

(65) Prior Publication Data

US 2011/0050649 A1 Mar. 3, 2011

(30) Foreign Application Priority Data

Sep. 1, 2009 (AU) ................................ 2009904185

(51) Int. Cl.
*G06F 3/042* (2006.01)
(52) U.S. Cl. ..................... 345/175; 178/18.09
(58) Field of Classification Search .......... 345/173–179; 178/18.01–18.09, 18.11, 20.01
See application file for complete search history.

(56) References Cited

U.S. PATENT DOCUMENTS

| | | | |
|---|---|---|---|
| 4,144,449 A | 3/1979 | Funk et al. | |
| 4,468,694 A | 8/1984 | Edgar | |
| 4,553,842 A * | 11/1985 | Griffin | 356/621 |
| 4,703,316 A | 10/1987 | Sherbeck | |
| 4,893,120 A | 1/1990 | Doering et al. | |
| 6,285,359 B1 | 9/2001 | Ogasawara et al. | |
| 6,362,468 B1 | 3/2002 | Murakami et al. | |
| 6,518,960 B2 * | 2/2003 | Omura et al. | 345/177 |
| 6,608,619 B2 | 8/2003 | Omura et al. | |
| 6,624,833 B1 | 9/2003 | Kumar et al. | |
| 6,727,885 B1 * | 4/2004 | Ishino et al. | 345/156 |
| 6,760,009 B2 | 7/2004 | Omura et al. | |
| 7,113,174 B1 | 9/2006 | Takekawa et al. | |
| 7,176,904 B2 | 2/2007 | Satoh | |
| 7,283,128 B2 | 10/2007 | Sato | |

(Continued)

FOREIGN PATENT DOCUMENTS

DE 102007021537 6/2008

(Continued)

OTHER PUBLICATIONS

"Introducing the NextWIndow 1900 Optical Touch Screen", A NextWindow White Paper, Next Window Human Touch May 22, 2007, 1-12.

(Continued)

*Primary Examiner* — Stephen G Sherman
(74) *Attorney, Agent, or Firm* — Kilpatrick Townsend & Stockton LLP

(57) ABSTRACT

A position detection system includes at least two optical units configured to image a space, a memory, and a processing device interfaced to the memory and the optical units. The processing device is configured to access image data from the first and second optical units and use this data to determine at least one of a current first position and a current second position representing touch points on a display. The processing device can define a polygon having at least four sides based the current first and current second positions and can access the memory to store and retrieve the polygon. If the processing device can determine only one of the current first position or the current second position based on the accessed image data, the processing device can use the previously defined polygon to estimate the other position that was not determined using the accessed image data.

13 Claims, 7 Drawing Sheets

U.S. PATENT DOCUMENTS

| | | | |
|---|---|---|---|
| 7,432,914 | B2 | 10/2008 | Kobayashi et al. |
| 7,460,110 | B2 | 12/2008 | Ung et al. |
| 7,515,141 | B2 * | 4/2009 | Kobayashi ............... 345/173 |
| 7,522,156 | B2 | 4/2009 | Sano et al. |
| 7,692,625 | B2 | 4/2010 | Morrison et al. |
| 7,755,613 | B2 | 7/2010 | Morrison et al. |
| 2002/0145596 | A1 | 10/2002 | Vardi |
| 2005/0030287 | A1 | 2/2005 | Sato |
| 2005/0104860 | A1 | 5/2005 | McCreary et al. |
| 2006/0012579 | A1 | 1/2006 | Sato |
| 2006/0202974 | A1 | 9/2006 | Thielman |
| 2006/0232830 | A1 | 10/2006 | Kobayashi |
| 2008/0143682 | A1 | 6/2008 | Shim et al. |
| 2009/0135162 | A1 | 5/2009 | Van De Wijdeven et al. |
| 2009/0213093 | A1 | 8/2009 | Bridger |
| 2009/0219256 | A1 | 9/2009 | Newton |
| 2009/0278816 | A1 | 11/2009 | Colson |
| 2009/0284495 | A1 * | 11/2009 | Geaghan et al. ............ 345/174 |
| 2009/0309844 | A1 | 12/2009 | Woo et al. |
| 2009/0309853 | A1 | 12/2009 | Hildebrandt et al. |
| 2010/0045629 | A1 | 2/2010 | Newton |
| 2010/0045634 | A1 | 2/2010 | Su et al. |
| 2010/0079412 | A1 | 4/2010 | Chiang et al. |
| 2010/0090987 | A1 | 4/2010 | Lin et al. |
| 2010/0182279 | A1 | 7/2010 | Juni |
| 2010/0193259 | A1 | 8/2010 | Wassvik |

FOREIGN PATENT DOCUMENTS

| | | |
|---|---|---|
| EP | 1577745 | 9/2005 |
| JP | 2003303046 | 10/2003 |
| WO | WO-2008007276 | 1/2008 |
| WO | WO-2009102681 | 8/2009 |
| WO | WO-2009137355 | 11/2009 |
| WO | WO-2010039663 | 4/2010 |
| WO | WO-2010044575 | 4/2010 |

OTHER PUBLICATIONS

"PCT Search Report and Written Opinion", PCT Application No. PCT/US2009/033624, Mar. 29, 2010.

"PCT Search Report and Written Opinion", PCT Application No. PCT/US2009/058682 Apr. 27, 2010.

Herot, Christopher et al., "One-Point Touch Input of Vector Information for Computer Displays", Architecture Machine Group Massachusetts Institute of Technology Oct. 31, 1977, 210-216.

* cited by examiner

DETERMINING THE LOCATION OF TOUCH POINTS IN A POSITION DETECTION SYSTEM

CROSS-REFERENCE TO RELATED APPLICATIONS

This application claims priority to Australian Provisional Application No. 2009904185, filed Sep. 1, 2009 by inventors John Newton and Keith Colson, and entitled "A Method of Determining Touch Locations on a Touch Screen," the contents of which are incorporated herein by this reference.

TECHNICAL FIELD

The present invention generally relates to position detection, such as detection of one or more touches on a display screen or other touch surface.

BACKGROUND

Touch-enabled devices allow a user to interface with a computer by touching certain areas of a display screen or other surface and are increasing in demand as more users seek intuitive, easy-to-use interfaces. Such devices may use multiple and simultaneous touches to initiate certain computer events, but existing detection systems may have difficulty detecting the more complex combinations of touches.

For example, an optical position detection system may use one or more optical sensors to register touch locations based on imaging a detection area. A touch point corresponding to a first object can become lost or hidden from the view of optical sensor(s) due to a shadow cast by a second object in the detection area and/or if the second object obscures the first object or its shadow from view. This may occur, for example, when one or both of the first and second objects move during a pinching or dragging motion.

SUMMARY

A position detection system includes a memory, at least two optical units configured to image a space, and a processing device interfaced to the memory and the optical units. The processing device is configured to access image data from the first and second optical units and use this data to determine at least one of a current first position and a current second position representing touch points on a display. If both the current first and current second positions can be determined based on the image data, the processing device can define a polygon having at least four sides based on the current first and current second positions and can store a representation of the polygon in the memory. If the processing device can determine only one of the current first position or the current second position based on the accessed image data, the processing device can use the polygon as previously defined to estimate the other position that was not determined using the accessed image data.

The current first position and the current second position can be determined by using detected light, such as light sensed by sensors in the optical units, to locate edges of blockages occurring in a particular space on the display. The edges can be used to determine a centerline between the blockages and the optical units, and the centerlines can be used to determine one or both positions using triangulation. A processing device can determine the current first position and/or the current second position by defining and storing in memory an object model based on the width of the blockage.

The processing device can match parameters of the object model to parameters of the detected blockage to determine or estimate the positions.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Embodiments of the present invention relate to a position detection system for detecting touch points on an optical display screen. Embodiments are described for determining the location of at least two simultaneous touch points at rest and while moving across a display screen. Optical units, a processing device, and a memory can be used to determine the location of touch points on an optical touch screen. Additionally, various algorithms or techniques can be used to calculate the location of the touch points.

Figure 1:
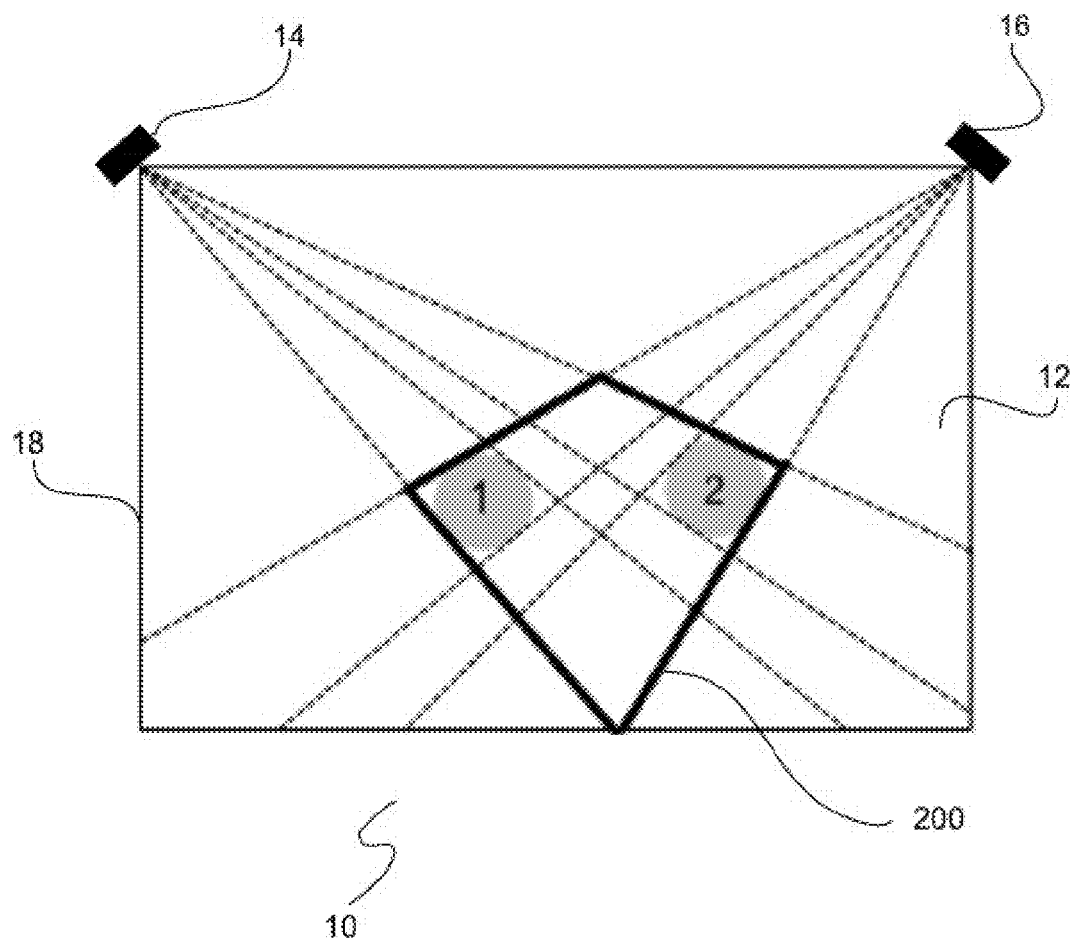
FIG. 1 depicts an optical touch screen comprising optical units and touch points.

FIG. 1 depicts a position detection system 10 which includes a display 12, retroreflective material 18, a first optical unit 14, and a second optical unit 16. An imaged space can include by some or all of the space above the display 12 or a space above a cover that is substantially parallel to the display 12. Although a display 12 is shown here, the techniques could be used with another surface, such as a trackpad or other input surface. Position detection system 10 can comprise a computing device, such as a laptop, desktop, or other computer, a mobile device (e.g., PDA, tablet, smartphone, etc.) a television, kiosk, or other appliance, or may be included in a device interfaced to a computer or incorporated into another device (e.g., a vehicle).

In the example of FIG. 1, the optical units 14 and 16 are located in the upper left and upper right corner of display 12. They can also be located at the lower corners or at any other point along the perimeter of the display 12. Although FIG. 1 shows the optical units 14 and 16 angled towards generally the center of the display 12, various other orientations of the optical units can be used. For example, the first optical unit 14 and/or the second optical unit 16 can be rotated clockwise or counterclockwise. The positioning of the optical units can work in conjunction with the retroreflective material 18, which reflects or disperses light emitted by the optical units. In some implementations optical units 14 and 16 can be hidden underneath a bezel located along the periphery of the display 12, with retroreflective material mounted to the bezel, display, or otherwise positioned.

Fewer or more optical units can be used in other embodiments. According to one embodiment, the optical units 14 and 16 can image a space by emitting light and using a sensor within the optical unit to detect changes in light output levels across the width of the sensor. In some embodiments one or both optical units include at least one light source (e.g., an infrared LED or other source) adjacent the sensor, with the light returned by the retroreflective material in the absence of a blockage. In other embodiments, an external source near the optical units and/or elsewhere can be used, or the optical units 14 and 16 can rely on ambient light reflected by the object(s) and/or light emitted by the objects. As another example, one or more illumination sources may illuminate the space from the edges.

One or more objects (e.g., a user's fingers and/or a stylus) can touch or approach display 12 at a current first position 1 and a current second position 2. The object(s) cast shadows S1-S4 indicated by the dotted lines shown in FIG. 1. The shadows represent blockages that reduce the level of light as seen by the optical units 14 and 16. In the absence of a blockage, the reflective material 18 would return light to the respective optical units. In particular, the blockage at current first position 1 casts shadow S1 in light imaged by optical unit 16 and shadow S3 in light detected using optical unit 14. The blockage at current second position 2 casts shadow S2 in light detected using optical unit 16 and shadow S4 in light detected using optical unit 14.

Figure 2:
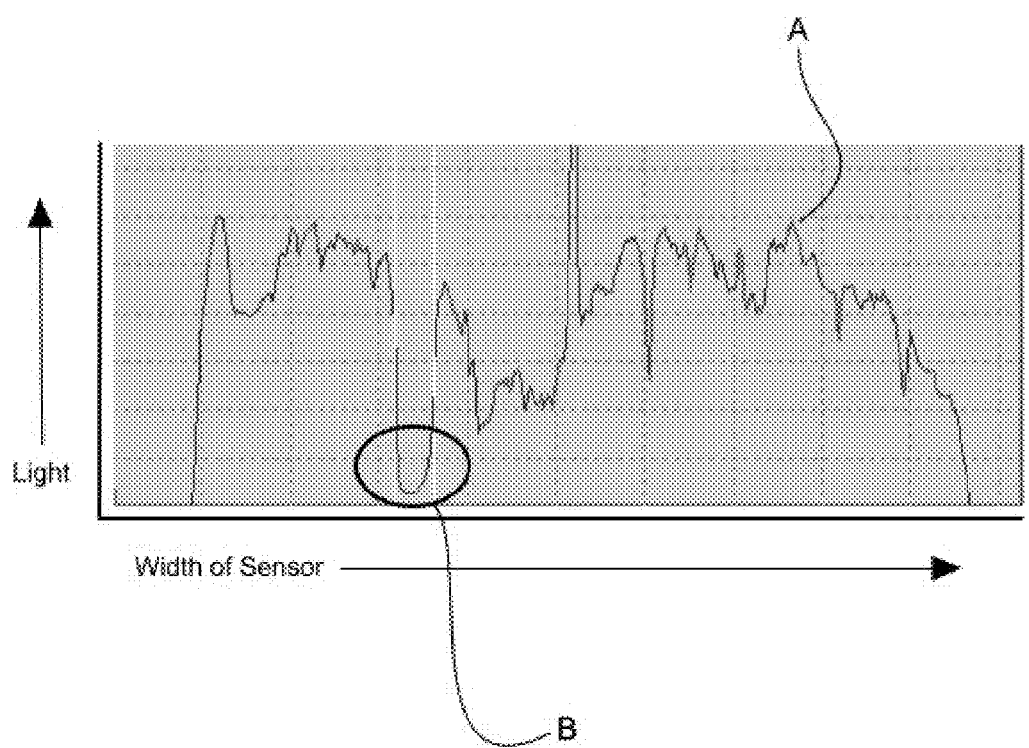
FIG. 2 is a signal diagram depicting a pattern of light detected due to a blockage event.

FIG. 2 is a signal diagram that depicts a decrease in light detected at an optical unit. In this example, light intensity is shown at A and, due to a blockage, the light intensity as detected drops as shown at point B. The edges of the blockages can be identified based on the detected drop in intensity, with the edges and the geometry of the touch detection system used to determine at least one of the current first position 1 and the current second position 2.

Figure 3:
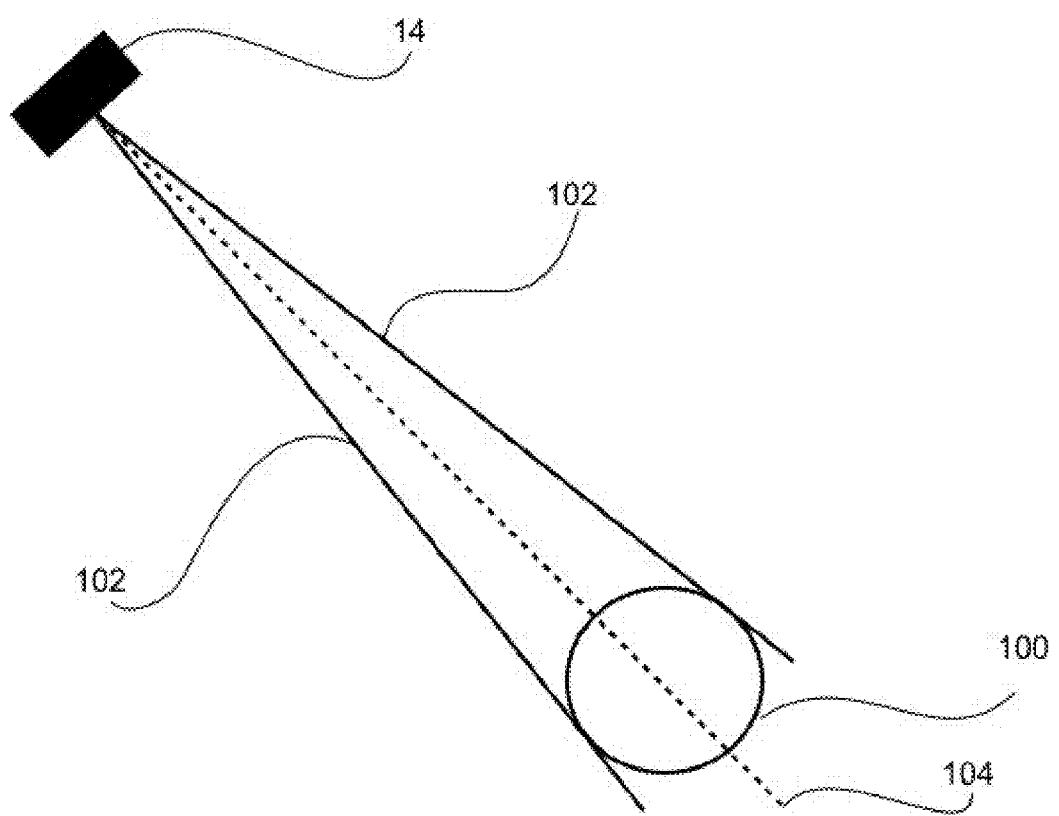
FIG. 3 depicts the edges and centerline of a blockage detected by an optical unit.

The edges can be used to determine a centerline of the blockages, with one such centerline shown in FIG. 3 with respect to optical unit 14. The centerline 104 runs along the longitudinal center between the edges 102 from a current position 100 to the optical unit. A similar centerline can also be formed between the current position 100 and the optical unit 16. The intersection of the centerlines can determine the current first position 1 or the current second position 2.

In one embodiment, the processing device can also determine the current first position 1 and the current second position 2 in part by defining an object model based on the width of the blockage. One or more parameters of the object model can be matched with one or more parameters of the detected blockage to determine an object likely to be causing the blockage. An example of the parameters used to perform the match can be length, width, size, and shape. Other parameters that are common between the object model and the detected blockage can be used to perform the match. The object model can be used to verify whether a subsequently detected blockage matches the expected parameters.

Returning to FIG. 1, a processing device, such as microprocessor 20, can interface with the optical units 14 and 16 and a memory 22 embodying one or more program components (referred to as detection module(s) 24 in FIG. 1) that configure the processor to determine one or more touch positions using the image data as set forth herein. In some embodiments, memory 22 can comprise a RAM, ROM, cache, or another type of memory. As another example, memory 22 can comprise a hard disk, removable disk, or any other storage medium capable of being accessed by a processing device. In any event, memory 22 is used to store the program code that configures the processing device to determine the position(s). Such storage devices can be interfaced with the processing device over a bus located within one computer system, or they can be located in a system external to the processing device that is accessible via a network connection, for example. After the first, second, and/or other positions are determined the position(s) can be passed to other program components, e.g., to an operating system or application to update a screen coordinate, identify a command (e.g., a selection, input of a gesture), etc.

If both the current first position and current second position can be determined using the image data, the processing device can store a geometric representation, such as polygon 26, based on the determined the current first position 1 and the current second position 2. For example, polygon 26 can be defined so that the current first and second positions 1 and 2 are located in opposite corners as shown in FIG. 1. According to one embodiment, the polygon can have four sides. Polygons having more sides can be defined by the processing device; the number of sides will vary according to the number of optical units and touch points. In this example, the polygon is defined so that the sides of the polygon are tangential to the edges of the blockages. As another example, the polygon can be defined so that vertices of the polygon are located at centers of the touch points.

As noted above, data used to determine both the current first or second position may not always be available—for example, one of the objects can be lost or hidden from the view of the optical units. The processing device can store the polygon in memory to be later accessed in the event that only one of the current first position 1 or the current second position 2 can be determined from the image data. The available current touch position(s), the polygon, and/or other information can be used to estimate the other current touch position based on an assumption that, even after the movement, the polygon continues to represent a geometric relationship between the positions.

Figure 4:
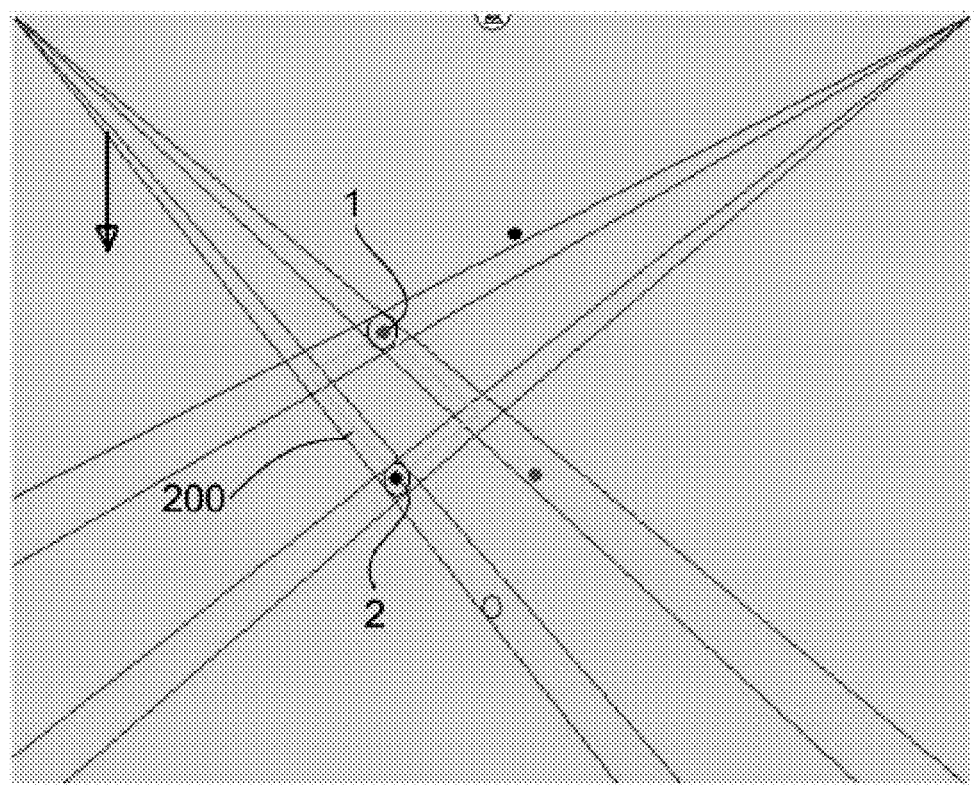
FIG. 4 depicts an example of multiple touch points on an optical touch screen.

FIG. 4 shows an illustrative arrangement of the first and second positions 1 and 2, corresponding shadow edges, and a polygon 26. Such an arrangement can result due to movement when a user begins a pinching motion with two fingers along the display 12, when a user makes a two-finger contact to subsequently input a gesture by moving one or both fingers, and/or by other types of intended inputs.

Figure 5:
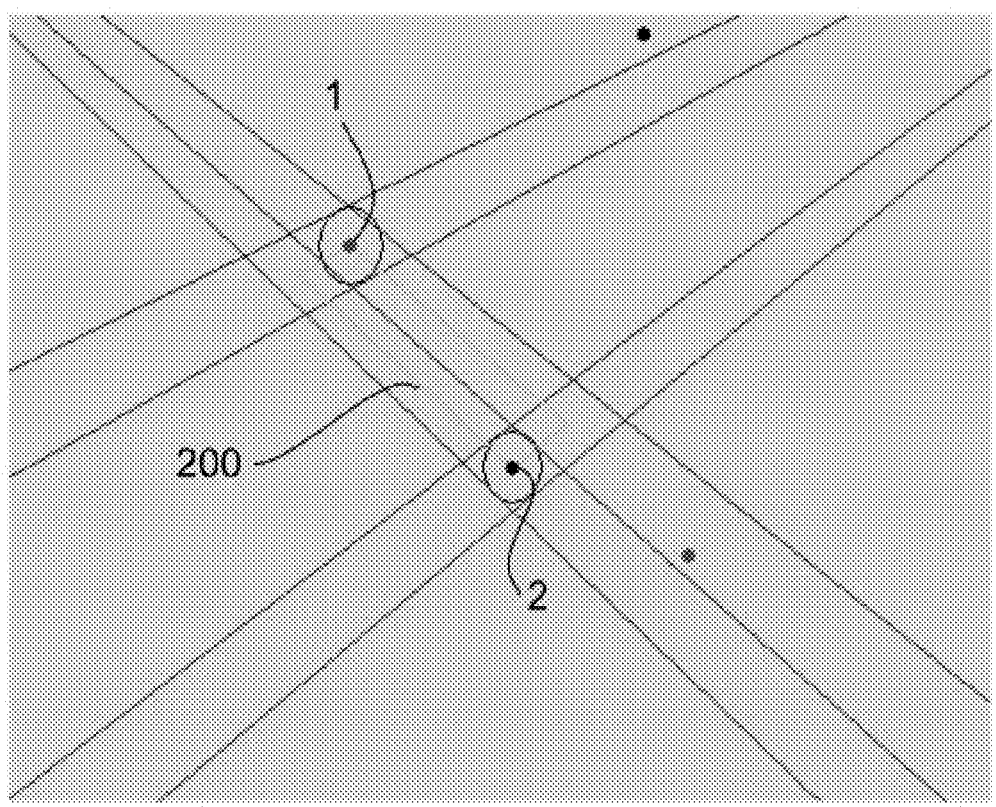
FIG. 5 is a flowchart showing steps in an illustrative method for determining a plurality of touch positions.

FIG. 5 is a flowchart showing steps in a method 500 that can be carried out by a position detection system to account for user inputs in which one or more touch points move. Generally speaking, the routine can be carried out as a series of iterations. The iterations can, for example, correspond to a refresh rate (e.g., 60 Hz, 120 Hz, etc.) of the position detection system. Alternatively, the iteration rate may depend upon detecting a change in the image data—i.e., if no movement is detected, then positions may not be updated or may be updated at a lower frequency until a change in the image data meets a given threshold.

As shown at 502, the method first determines if two touch positions are indicated by the image data. For example, this may be indicated by the presence of two blockages in image data available to one or both imaging units. If two touches are indicated, flow moves to block 504 where the position detection system attempts to determine the first and second positions using the image data.

After the positions are calculated at block 504, flow moves to block 506, which represents storing the positions in memory and defining or updating a geometric representation of the positions in memory. The geometric representation can be stored in memory in various forms. For example, as noted above some embodiments use a polygon having at least four sides, and the polygon may be defined so that the first and second positions are at opposite corners. In one embodiment, the location of pixels defining the sides of the polygon can be stored. As another example, data defining vertices of the polygon and relationships thereof (e.g., distance, index values for the vertices) can be stored along with data indicating which vertices correspond to touch positions. As a further example, defining the polygon may simply comprise storing an indication that a four-sided polygon is present with the first and second positions at opposite corners thereof.

Assume, for the following example, that the position detection system can determine both the current first position 1 and current second position 2 shown in FIG. 4. The current first and second positions may be distinguished from "ghost" positions G1 and G2 in any suitable manner by another subroutine. Examples of suitable techniques can be found in U.S. patent application Ser. No. 12/368,372, filed Feb. 10, 2009, which is incorporated by reference herein in its entirety (and which published as U.S. Patent Application Publication No. 2009/0219256). Other examples can be found in U.S. patent application Ser. No. 12/434,217, filed May 1, 2009, which is incorporated by reference herein in its entirety (and which published as U.S. Patent Application Publication No. 2009/0278816).

As another example, the current first and second positions can be identified based on the width of the detected blockages. For example, the width of the blockages as detected at one optical unit can be used to determine a corresponding object model (e.g., a finger, stylus, etc.). The current first and second positions will be those positions whose corresponding blockages have a width consistent with the model as detected at both optical units.

A four-sided polygon 26 may be defined as polygon A-B-C-D by storing coordinate values for each vertex A-D and data indicating that the first and second positions correspond to vertices A and C, respectively. The geometric representation can be stored as a polygon with four sides that are tangent to the edges of the touches as noted above and shown in FIG. 1. As another example, the polygon can be defined with vertices that correspond to the centres of the touches as shown in FIG. 4. In any event, after the two positions are determined and the geometric relationship is defined or updated, flow returns to block 502.

Returning to block 502, if two touch positions are not indicated, flow moves to block 508, which represents checking whether two touch positions were calculated previously. If only one touch position was previously calculated, the routine can move to block 510, which represents determining a single touch position. For instance, the routine can use triangulation to determine the single touch position based on identifying an intersection between centerlines of two shadows cast by the object. It is possible that a user input transitions from providing a single-touch input to providing multiple touches, but in the very first iteration the multiple touches are not indicated. In such a scenario, a single touch will be registered until an iteration in which the system can define/update the polygon.

If at block 508 the position detection system determines that two positions were previously calculated, then flow moves to block 512. In this scenario, two touches may be present, but either the current first or second position cannot be determined from the image data. If that is the case, the polygon stored in memory along with the one of the current first or second positions that was determined can be used to estimate the position that could not be determined from the image data by superimposing the polygon.

Block 512 represents superimposing the geometric representation from memory onto the determined current position in a manner that is consistent with available position data (if any) and the available image data. In some embodiments, the object model is also considered when superimposing the geometric representation, such as to ensure that the object, as modeled and at its estimated position, actually fits in the polygon as superimposed or fits with its center at a vertex of the polygon as superimposed in a manner consistent with the image data. Block 514 represents estimating the second current position as that position which, with respect to the superimposed geometric representation, is consistent with the second position's previous relationship with the representation. "Superimposing" is not meant to imply that a visual representation is necessarily generated—suitable in-memory representations of the geometry can be used by the position detection system. Additionally, as will be apparent from the figures, the polygon as superimposed may be of different size or proportion due to movement of one or more of the touch point(s).

In the following example, the four-sided polygon is used to estimate a second position, but embodiments could estimate multiple other positions. In such cases, the geometric representation may be superimposed based on one position calculated from the image data or from multiple positions determined from the image data. For example, in a three-touch scenario two touch locations may be determined from image data, with third estimated by superimposing a polygon. Alternatively, only a first position may be determined from the image data, with the second and third positions determined based on the polygon.

Figure 6:
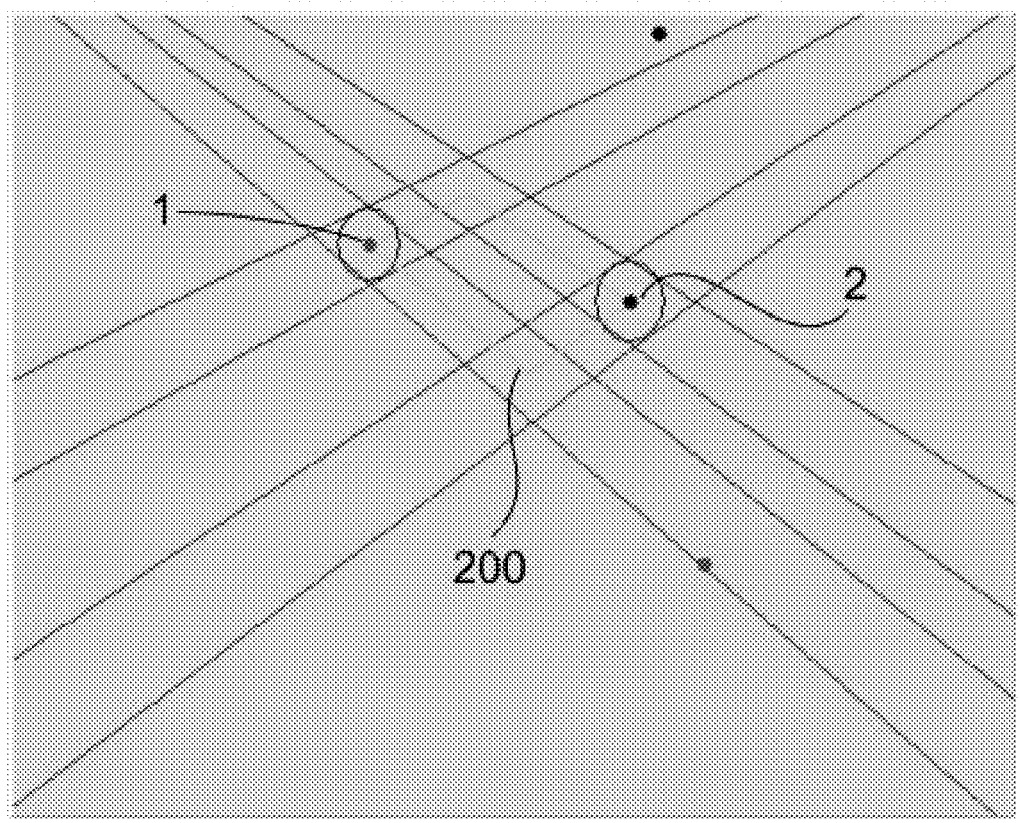
FIGS. 6-7 show an example of multiple touch points on an optical touch screen as one or both of the points change location.

As shown in FIG. 6, first current position 1 and second current position 2 have moved closer together as compared to FIG. 4, such as due to a pinching gesture, and the shadows cast due to the blockages at first current position 1 and second current position 2 nearly overlap, particularly at the lower-right corner of the screen. Nonetheless, the positions remain at the same respective vertices of polygon 26 and if only one such position could be determined from the image data, polygon 26 could be used to estimate the other position.

Specifically, polygon 26 could be superimposed so that vertex A corresponds to first current position 1 and vertex D corresponds to the adjacent ghost point G1. Alternatively, polygon 26 could be superimposed so that vertex A corresponds to the first current position 1 and vertex B corresponds to the adjacent ghost point G2. In either event, current position 2 could be estimated as the coordinate of vertex C.

The system can superimpose the polygon consistent with the object model defined when both positions were detected using image data. Therefore, although there are multiple scenarios of superimposing the polygon (e.g., with vertex D at current position 1 and vertex C at G2, or with vertex B at current position 1 and vertex C at point G1), the various scenarios can be checked against the object model to determine a scenario of points consistent with the detected blockage widths and the object model. For example, if vertex D were at position 1 and vertex C at G2, then the expected location of current position 2 would be at vertex B. However, the width of the shadow corresponding to G2 (which would result from a blockage at vertex B in this scenario) does not match the expected width—if the blockage were at vertex B, then the detected blockage that has resulted in G2 would be wider.

Figure 7:
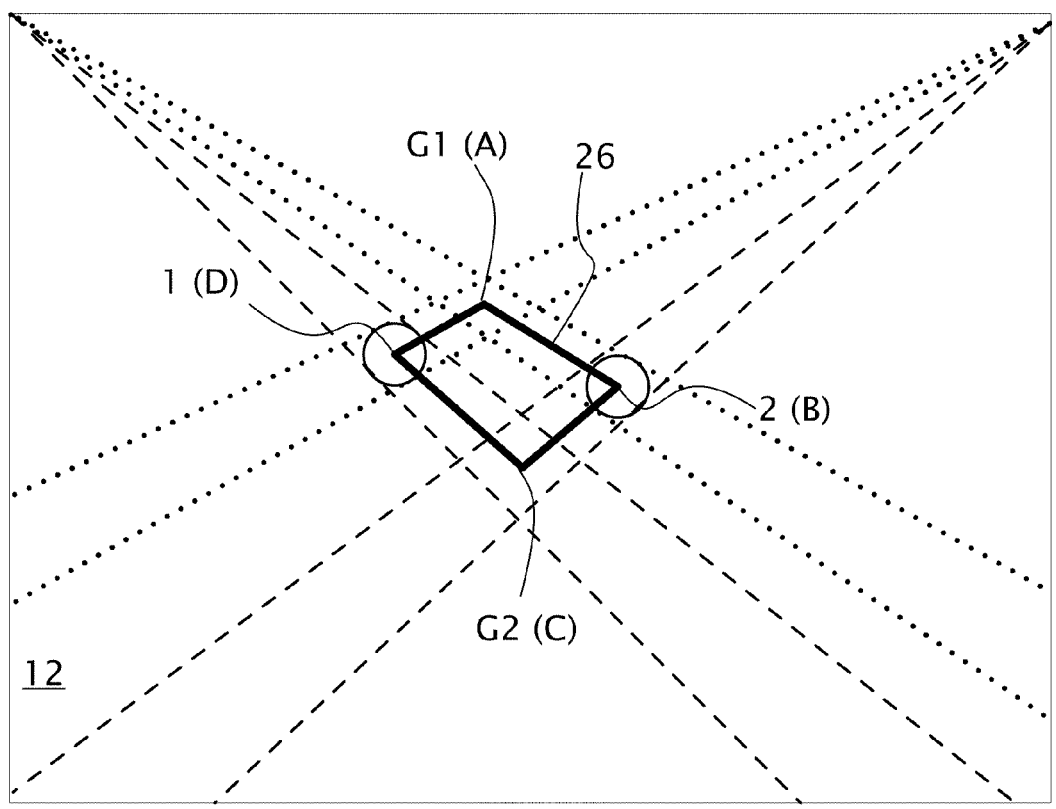
Figure 1:
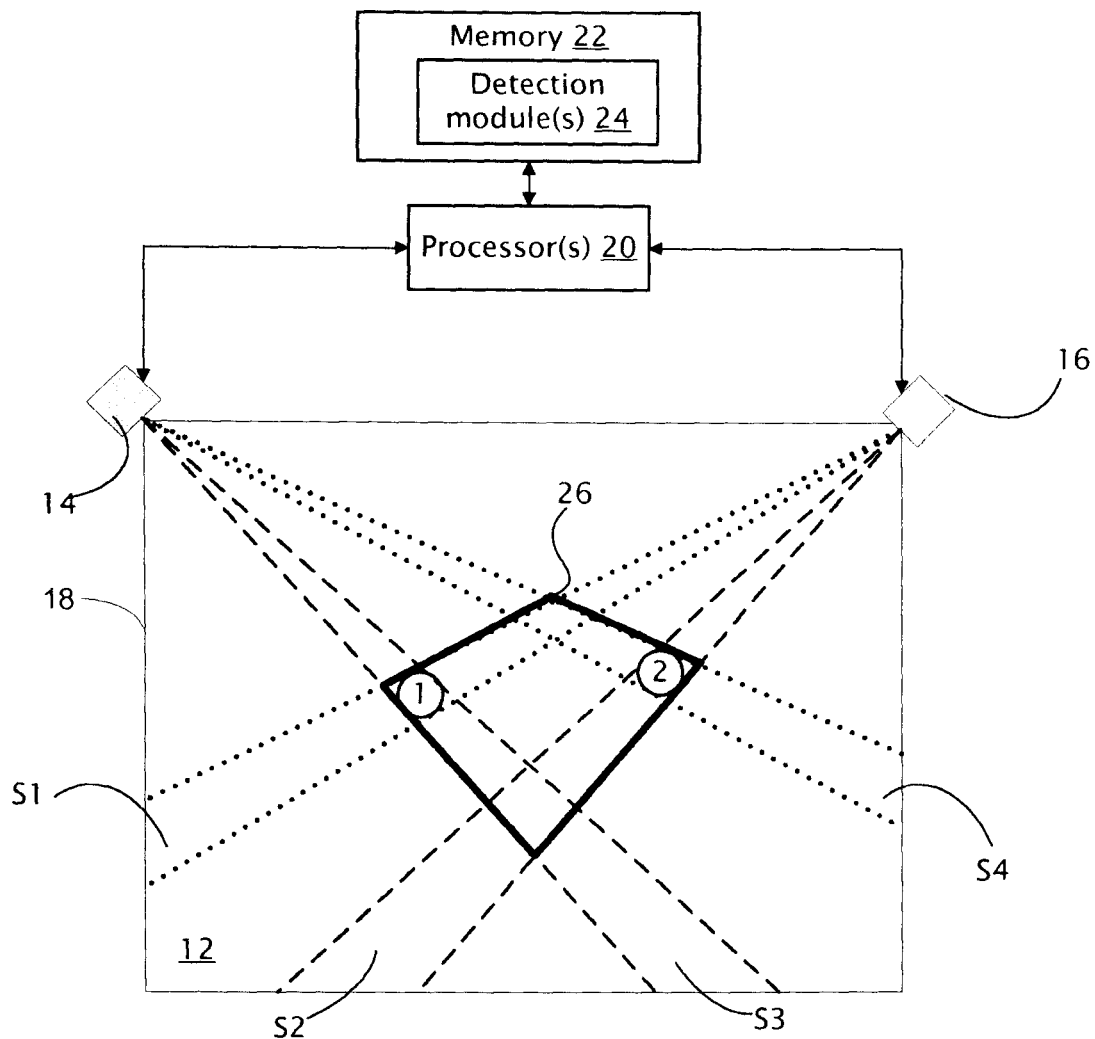
Figure 2:
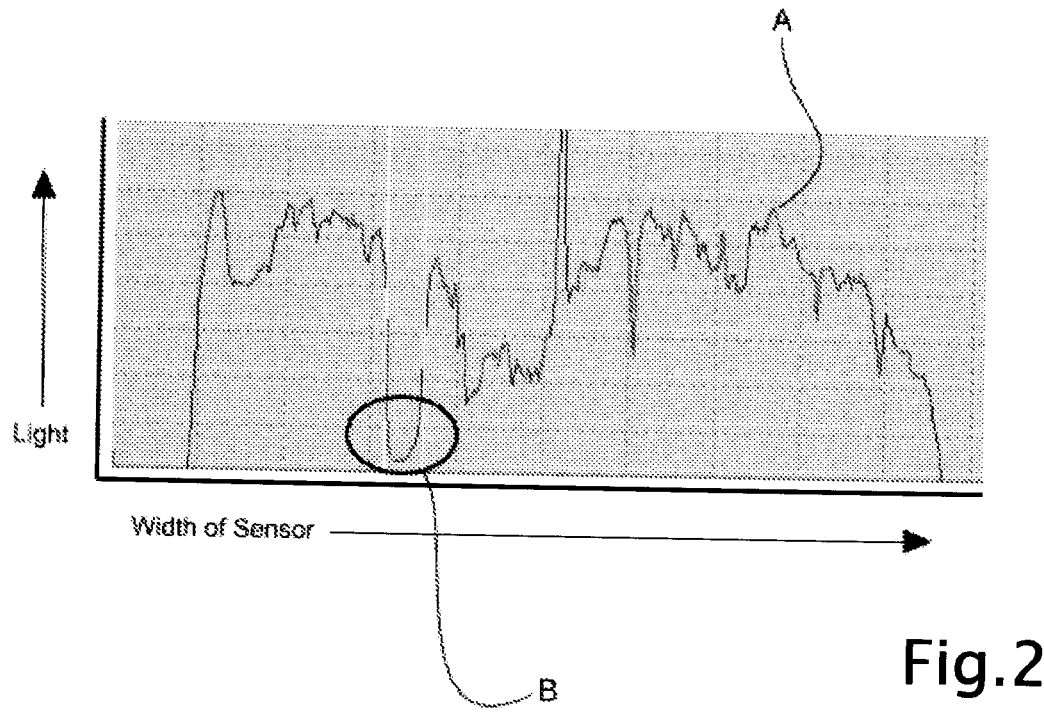
Figure 3:
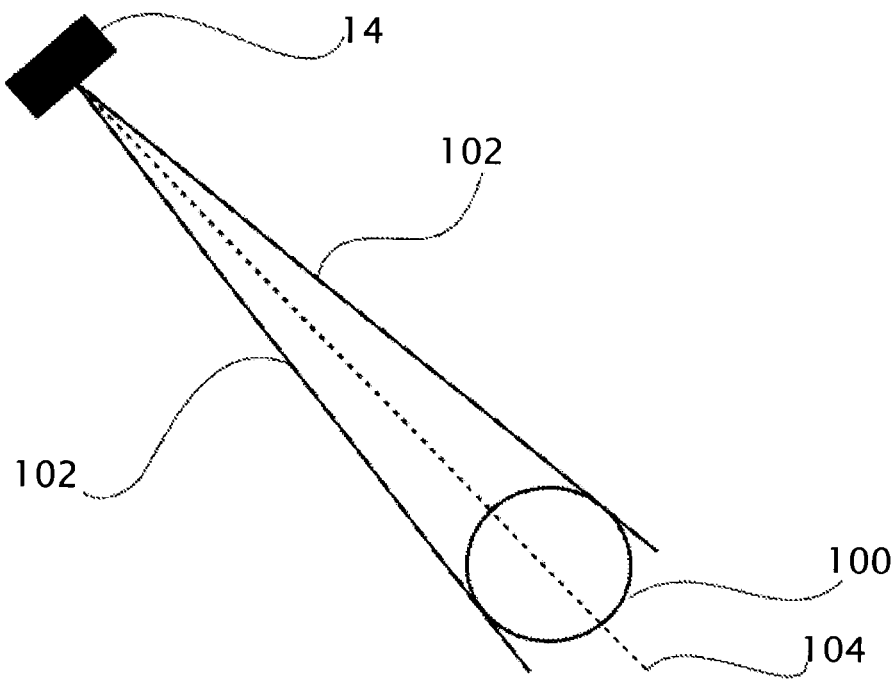
Figure 4:
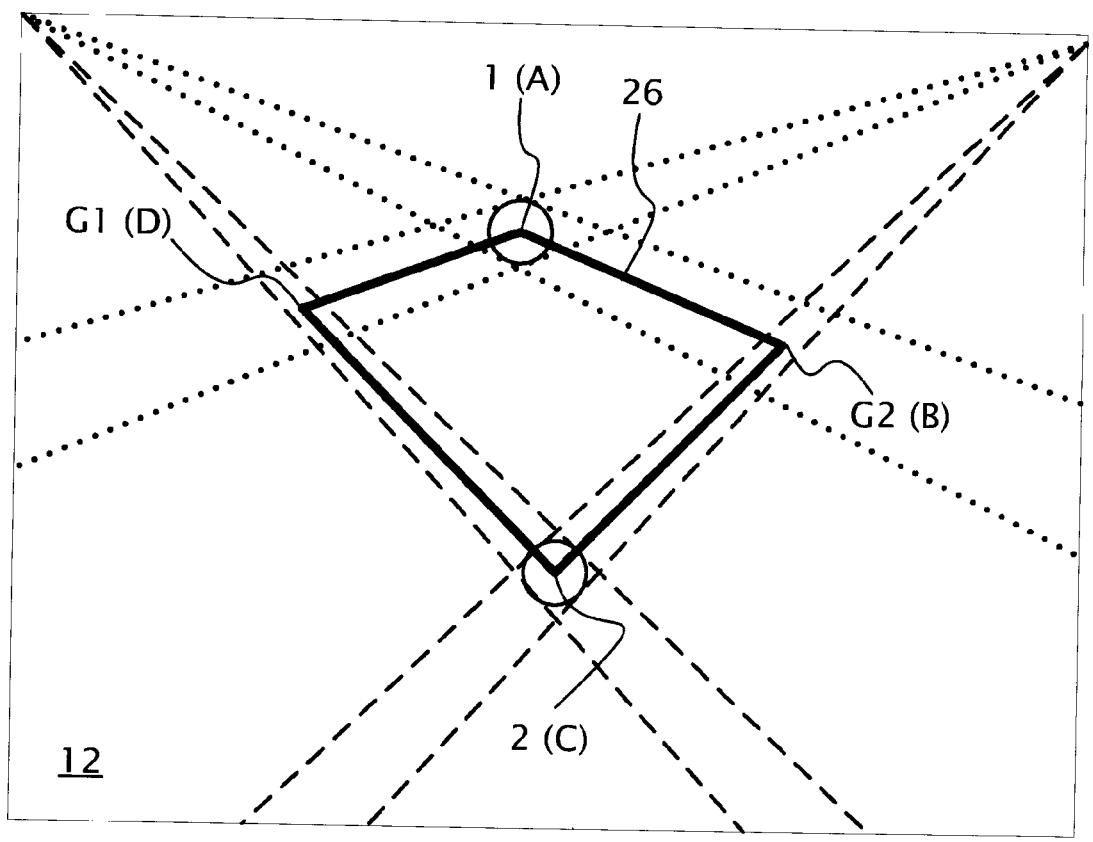
Figure 5:
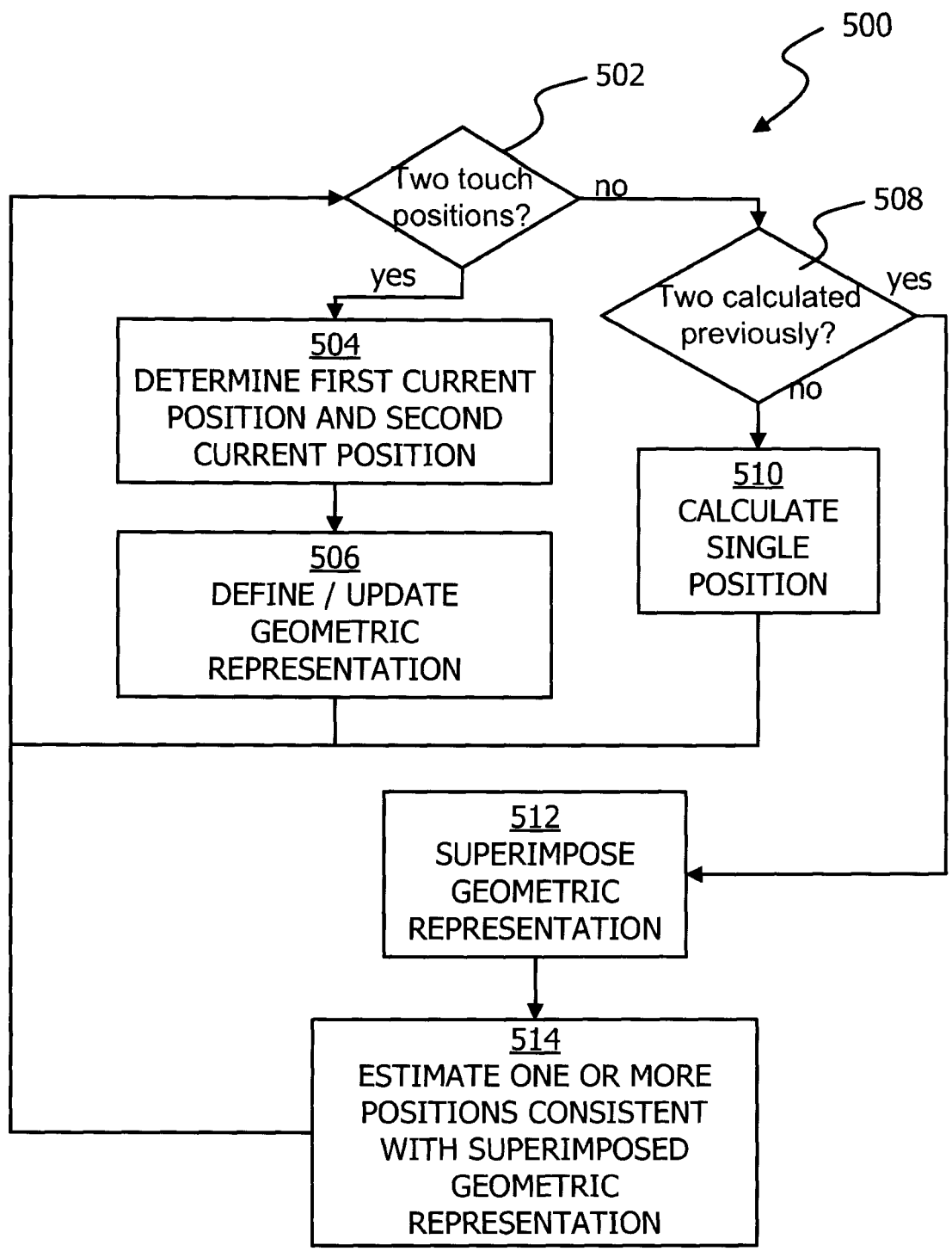
Figure 6:
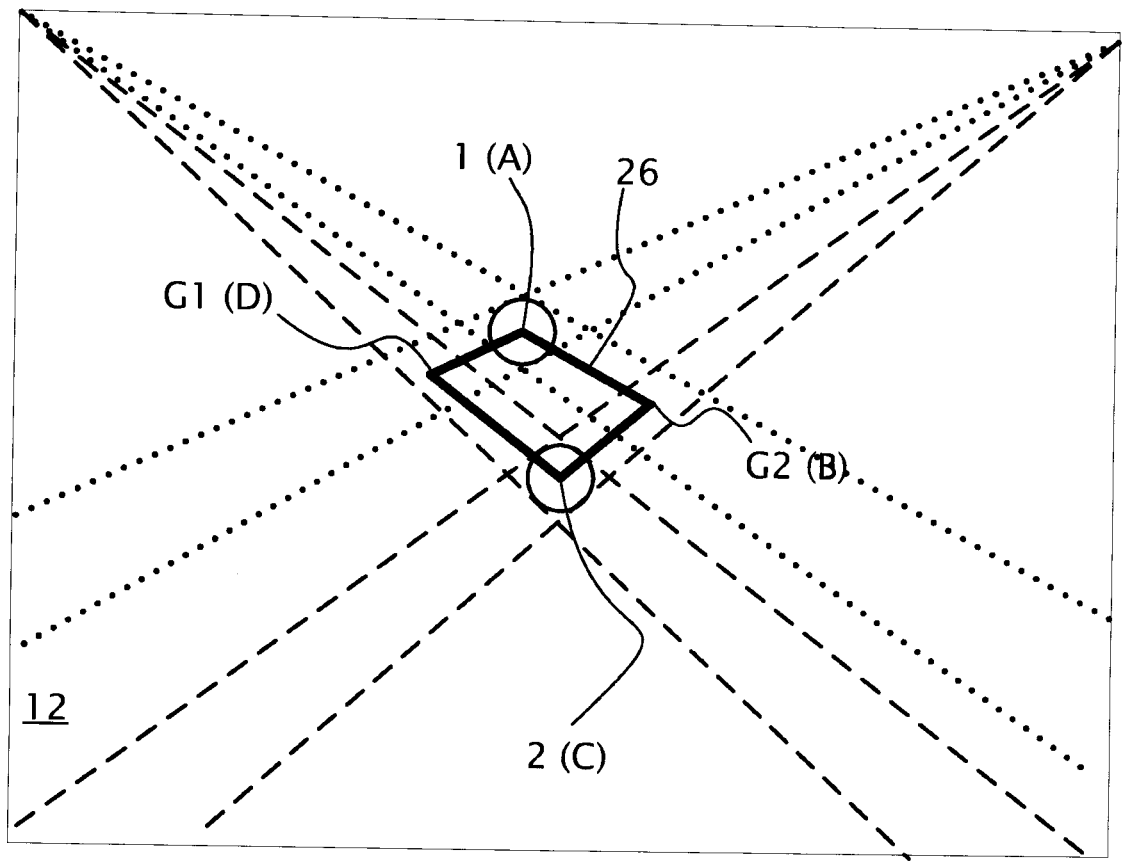
Figure 7:
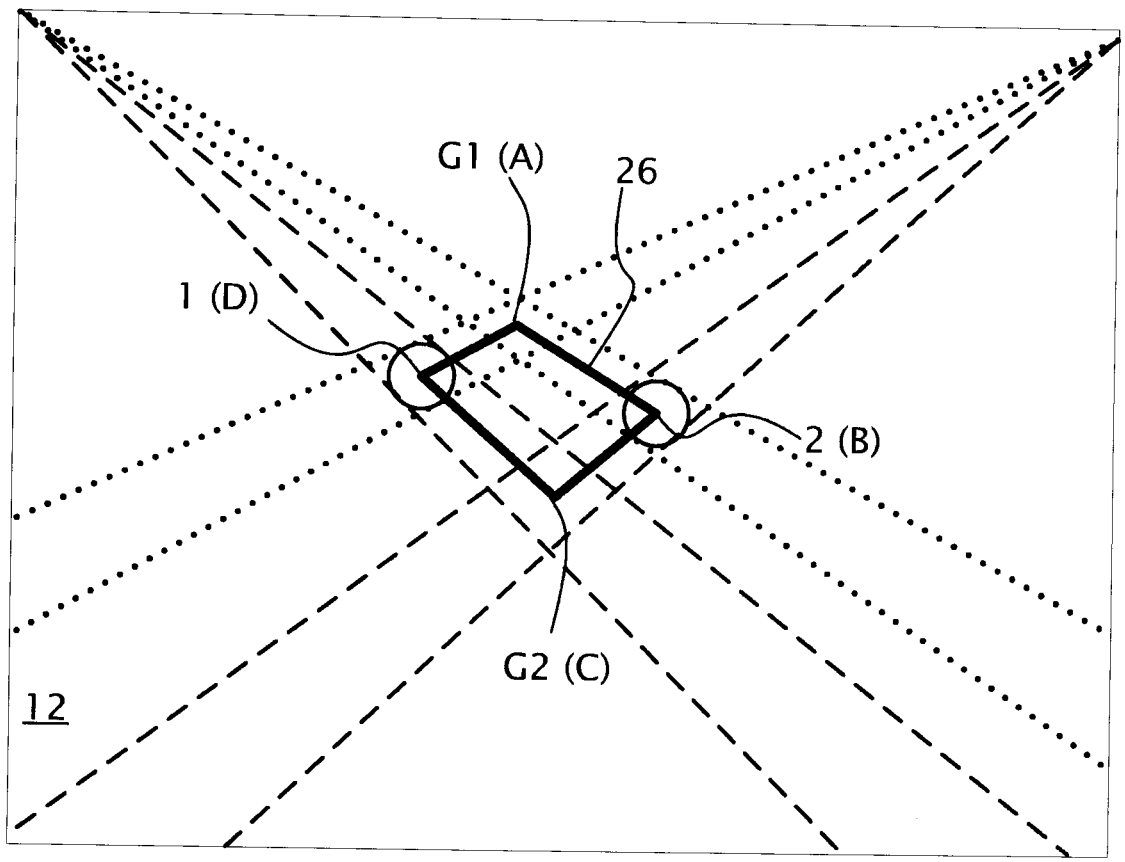

In the following example, assume that the current first and second positions as shown in FIG. 6 could be determined from the image data but then the first current position 1 and second current position 2 change orientation relative to the touch area as shown in FIG. 7. Specifically, the positions have been rotated counterclockwise. Such a movement may also result in loss of image data for either of position 1 or 2. In that event, polygon 26 can be superimposed based on the available position and image data. For example, if first current position 1 (as shown in FIG. 7) is known, but second current position 2 is not known, polygon 26 can be superimposed so that first current position 1 meets its previous relationship with polygon 26 (i.e., the relationship shown in FIG. 6 in which the centre of first current position 1 is at a vertex of polygon 26). Second current position 2 can be estimated as the position corresponding to the opposite vertex of polygon 200 as superimposed, since when the polygon was defined (i.e., with respect to FIG. 6), the positions were at opposite vertices.

In this example, the polygon cannot be superimposed in a manner consistent with the image data and with current position 1 at vertex A. For instance, assuming one imaging device detects two blockages and one imaging device detects one blockage and current position 1 is the true touch point, the available image data will include either current position 1 and ghost point G1, or current position 1 and ghost point G2. As noted above, although the polygon could be superimposed in a number of scenarios, only one scenario will be consistent with the detected blockage widths.

Returning briefly to block 508, there is a scenario in which two touches may be followed by a single touch. In such a case, in an iteration following the transition from two touches to one touches, the single touch may be identified at block 502, but the system may at block 508 determine that two touches were calculated in the prior iteration. This scenario can be handled in any suitable way. For example, the system may limit the number of consecutive iterations which rely on the polygon to estimate one of the positions. This can avoid erroneously adding an unintended second touch while accounting for the possibility that an intended second touch may be obscured for multiple iterations.

Several of the foregoing examples were described with respect to an optical touch detection system that utilizes shadows and triangulation to determine the first and second touch positions. It will be appreciated that the present techniques could be applied in systems that use other principles to determine the first and second touch positions. For example, resistive and/or capacitive based systems can be used to determine a first and second position, with the geometric representation subsequently used in to update the first or second position if only one such position is subsequently available. As another example, the geometric representation can be used with other optical-based technologies such as those that rely on a grid, total internal reflection within a touched surface, and/or processing of images of the touch area to determine the first and second positions.

Several of the foregoing examples referred to a touch or touch event. It will be understood that the touch or touch event may occur when an object contacts the display or other surface; additionally or alternatively some systems may determine a "touch" even if no contact is made.

Embodiments described herein include computer components, such as processing devices and memory, to implement the described functionality. Persons skilled in the art will recognize that various parameters of each of these components can be used in the position detection system. For example, a processing device can be a microprocessor, DSP, or other device capable of executing computer instructions. A processing device of varying numbers and speeds can be used as the complexity of the position detection system increases. For example, a system with numerous optical units and a highly complex detection algorithm can use a greater number of processing devices. Furthermore, a processing device can communicate with an optical unit via a computer bus according to an exemplary embodiment.

In embodiments, an optical unit can comprise its own processing device, and/or could be interfaced to a CPU of a computing system such as a desktop, laptop, or other computer, a mobile device (e.g., mobile phone, tablet, etc.) via a suitable connection such as a USB bus.

A memory can store data and instructions for implementing the position detection system. Various types of memory, such as RAM, DRAM, and SDRAM, can be used to provide this functionality. The memory can be located external to an optical unit and in a computing system for which the optical unit is used to provide input and/or the optical unit can comprise its own memory, according to some embodiments. Embodiments may store instructions and/or program components in non-transitory computer-readable media including memory devices, optical media (e.g., CD-ROMS, DVDs, etc.), magnetic media (e.g., hard disks, etc.), and the like. As another example, embodiments could use hardware logic (e.g., application-specific integrated circuits (ASICS), field-programmable gate arrays (FPGAs), programmable logic devices (PLDs) etc.) to implement detection logic in addition to or instead of using a processor and software to carry out embodiments of the present subject matter.

It should be understood that the foregoing relates only to certain embodiments of the invention, which are presented by way of example rather than limitation. While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure does not preclude inclusion of such modifications, variations and/or additions to the present subject matter as would be readily apparent to one of ordinary skill in the art upon review of this disclosure.

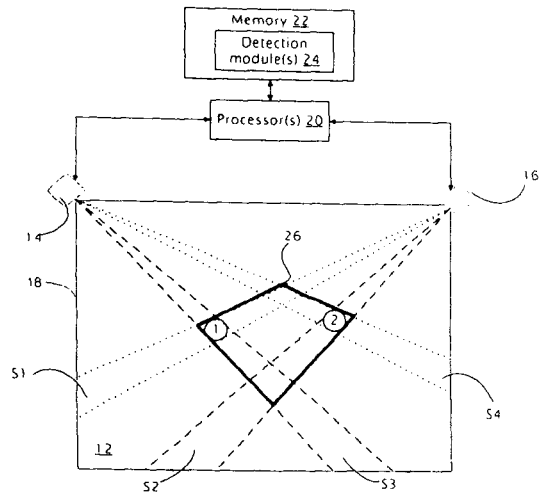

What is claimed:

1. A position detection system comprising:
a first optical unit configured to image a space;
a second optical unit configured to image the space;
a memory; and
a processing device interfaced to the memory and the optical units, the processing device configured to:
access image data from the first and second optical units;
iteratively determine at least one of a current first touch position and a current second touch position using the accessed image data;

in one iteration when both the current first touch position and the current second touch position are determined using the accessed image data: define, in the memory, a polygon based on the current first and current second touch positions, the polygon having at least four sides; and in a subsequent iteration when only one of the current first touch position or the current second touch position is determined using the accessed image data: access the polygon as previously defined in the memory and use the current first touch position or the current second touch position determined using the accessed image data, and the previously-defined polygon, to estimate the other touch position that was not determined using the accessed image data.

2. The position detection system of claim 1, wherein the imaged space comprises a display or a plane substantially parallel to the display and the current first touch position and current second touch position correspond to touches on the display or plane.

3. The position detection system of claim 1, wherein the optical units each comprise an optical sensor configured to image a retroreflective material positioned along one or more edges of a touch detection area in the space.

4. The position detection system of claim 3, wherein the optical units each comprise a light source configured to direct light toward the retroreflective material.

5. A position detection system, comprising:
a first optical unit configured to image a space;
a second optical unit configured to image the space;
a memory; and
a processing device interfaced to the memory and the optical units, the processing device configured to:
access image data from the first and second optical units;
iteratively determine at least one of a current first touch position and a current second touch position using the accessed image data, wherein determining at least one of the current first touch position and the current second touch position comprises using light detected by the optical units to identify edges of at least one blockage occurring in the space, the at least one blockage occurring at least one of the current first touch position or the current second touch position;
in one iteration when both the current first and current second touch positions are determined using the accessed image data: define, in the memory, a polygon based on the current first touch position and the current second touch position, the polygon having at least four sides; and in a subsequent iteration when only one of the current first touch position or the current second touch position is determined using the accessed image data: access the polygon as previously defined in the memory and use the current first touch position or the current second touch position determined using the accessed image data, and the polygon as previously defined in the memory, to estimate the other touch position that was not determined using the accessed image data.

6. The position detection system of claim 5, wherein determining at least one of the current first touch position and the current second touch position further comprises:
using the edges of the at least one blockage to: determine a centerline between the blockage and the first optical unit and, determine a centerline between the blockage and the second optical unit; and
wherein the determined current first touch position or current second touch position corresponds to the intersection of the centerlines.

7. The position detection system of claim 6, wherein the polygon is four-sided, the vertices of the polygon correspond to intersections of centerlines determined from respective blockages at the first current touch position and the second current touch position, and the first current touch position and second current touch position are at opposite vertices.

8. The position detection system of claim 6, wherein the processing device is configured to determine a width of the at least one blockage and to store, in the memory, an object model based on the width of the blockage.

9. The position detection system of claim 8, wherein the processing device is configured to determine the current first touch position and the current second touch position based on matching one or more parameters of the object model to one or more characteristics of a subsequently detected blockage.

10. The position detection system of claim 8, wherein the processing device is further configured to use the object model when using the polygon to estimate the current first or current second touch position.

11. The position detection system of claim 5, wherein the imaged space comprises a display or a plane substantially parallel to the display and the current first touch position and the current second touch position each correspond to touches on the display or plane.

12. The position detection system of claim 5, wherein the optical units each comprise an optical sensor configured to image a retroreflective material positioned along one or more edges of a touch detection area in the space.

13. The position detection system of claim 12, wherein the optical units each comprise a light source configured to direct light toward the retroreflective material.

* * * * *

UNITED STATES PATENT AND TRADEMARK OFFICE
CERTIFICATE OF CORRECTION

PATENT NO. : 7,932,899 B2  Page 1 of 8
APPLICATION NO. : 12/873466
DATED : April 26, 2011
INVENTOR(S) : Newton et al.

It is certified that error appears in the above-identified patent and that said Letters Patent is hereby corrected as shown below:

The Title page;

The Title page, showing the illustrative figure, should be deleted and substitute therefor the attached Title page.

Delete figs. 1-7 and substitute therefor the drawing sheets, consisting of figs. 1-7 as shown on the attached pages.

Signed and Sealed this
Tenth Day of January, 2012

David J. Kappos
*Director of the United States Patent and Trademark Office*

(12) United States Patent
Newton et al.

(10) Patent No.: US 7,932,899 B2
(45) Date of Patent: Apr. 26, 2011

(54) DETERMINING THE LOCATION OF TOUCH POINTS IN A POSITION DETECTION SYSTEM

(75) Inventors: John David Newton, Auckland (NZ); Keith John Colson, Auckland (NZ)

(73) Assignee: Next Holdings Limited (NZ)

( * ) Notice: Subject to any disclaimer, the term of this patent is extended or adjusted under 35 U.S.C. 154(b) by 0 days.

(21) Appl. No.: 12/873,466

(22) Filed: Sep. 1, 2010

(65) Prior Publication Data

US 2011/0050649 A1 Mar. 3, 2011

(30) Foreign Application Priority Data

Sep. 1, 2009 (AU) ............................... 2009904185

(51) Int. Cl.
*G06F 3/042* (2006.01)
(52) U.S. Cl. .................... 345/175; 178/18.09
(58) Field of Classification Search .......... 345/173–179; 178/18.01–18.09, 18.11, 20.01
See application file for complete search history.

(56) References Cited

U.S. PATENT DOCUMENTS

| | | | |
|---|---|---|---|
| 4,144,449 A | 3/1979 | Funk et al. | |
| 4,468,694 A | 8/1984 | Edgar | |
| 4,553,842 A * | 11/1985 | Griffin | 356/621 |
| 4,703,316 A | 10/1987 | Sherbeck | |
| 4,893,120 A | 1/1990 | Doering et al. | |
| 6,285,359 B1 | 9/2001 | Ogasawara et al. | |
| 6,362,468 B1 | 3/2002 | Murakami et al. | |
| 6,518,960 B2 * | 2/2003 | Omura et al. | 345/177 |
| 6,608,619 B2 | 8/2003 | Omura et al. | |
| 6,624,833 B1 | 9/2003 | Kumar et al. | |
| 6,727,885 B1 * | 4/2004 | Ishino et al. | 345/156 |
| 6,760,009 B2 | 7/2004 | Omura et al. | |
| 7,113,174 B1 | 9/2006 | Takekawa et al. | |
| 7,176,904 B2 | 2/2007 | Satoh | |
| 7,283,128 B2 | 10/2007 | Sato | |

(Continued)

FOREIGN PATENT DOCUMENTS

DE 102007021537 6/2008

(Continued)

OTHER PUBLICATIONS

"Introducing the NextWIndow 1900 Optical Touch Screen", A NextWindow White Paper, Next Window Human Touch May 22, 2007, 1-12.

(Continued)

*Primary Examiner* — Stephen G Sherman
(74) *Attorney, Agent, or Firm* — Kilpatrick Townsend & Stockton LLP

(57) ABSTRACT

A position detection system includes at least two optical units configured to image a space, a memory, and a processing device interfaced to the memory and the optical units. The processing device is configured to access image data from the first and second optical units and use this data to determine at least one of a current first position and a current second position representing touch points on a display. The processing device can define a polygon having at least four sides based the current first and current second positions and can access the memory to store and retrieve the polygon. If the processing device can determine only one of the current first position or the current second position based on the accessed image data, the processing device can use the previously defined polygon to estimate the other position that was not determined using the accessed image data.

13 Claims, 7 Drawing Sheets